(12) United States Patent
Nitta et al.

(10) Patent No.: US 7,682,687 B2
(45) Date of Patent: Mar. 23, 2010

(54) FORGERY-PREVENTING FILM

(75) Inventors: Katsukuni Nitta, Tokyo (JP); Kazuyo Senga, Tokyo (JP)

(73) Assignee: YUPO Corporation, Tokyo (JP)

( * ) Notice: Subject to any disclaimer, the term of this patent is extended or adjusted under 35 U.S.C. 154(b) by 1724 days.

(21) Appl. No.: 10/758,595

(22) Filed: Jan. 16, 2004

(65) Prior Publication Data

US 2004/0188996 A1    Sep. 30, 2004

Related U.S. Application Data

(63) Continuation-in-part of application No. PCT/JP02/07172, filed on Jul. 15, 2002.

(30) Foreign Application Priority Data

Jul. 16, 2001    (JP)    ............... 2001-215783

(51) Int. Cl.
*B32B 7/00*    (2006.01)
*B42D 15/00*    (2006.01)

(52) U.S. Cl. .................. 428/212; 428/354; 428/916; 283/72; 283/81; 283/83

(58) Field of Classification Search .............. 428/195.1, 428/212, 916, 354; 283/72, 81, 83
See application file for complete search history.

(56) References Cited

U.S. PATENT DOCUMENTS

| | | | | |
|---|---|---|---|---|
| 4,469,741 A | * | 9/1984 | Akao | ............... 428/214 |
| 4,653,640 A | * | 3/1987 | Akao | ............... 206/455 |
| 4,661,401 A | * | 4/1987 | Akao | ............... 428/215 |
| 5,820,971 A | | 10/1998 | Kaule et al. | |
| 6,013,363 A | * | 1/2000 | Takahashi et al. | ......... 428/315.9 |
| 6,562,454 B2 | * | 5/2003 | Takahashi et al. | ............ 428/354 |

FOREIGN PATENT DOCUMENTS

| | | |
|---|---|---|
| DE | 4404128 A1 | 8/1994 |
| DE | 10054803 A1 | 5/2002 |
| EP | 0609683 A1 | 8/1994 |
| JP | 58-155262 U | 10/1983 |
| JP | 61-210545 A | 9/1986 |
| JP | 03-34757 U | 4/1991 |
| JP | 06-040145 A | 2/1994 |
| JP | 07-297592 A | 11/1995 |
| JP | 08-13539 B2 | 2/1996 |
| JP | 09-254340 A | 9/1997 |
| JP | 3059923 B2 | 4/2000 |
| JP | 2000-172157 A | 6/2000 |
| JP | 2000/318290 A | 11/2000 |
| JP | 2001-162955 A | 6/2001 |
| JP | 2000/121804 A | 8/2001 |
| WO | WO 97/40464 A | 10/1997 |
| WO | 00/20220 A1 | 4/2000 |

* cited by examiner

*Primary Examiner*—David R Sample
*Assistant Examiner*—Lawrence D Ferguson
(74) *Attorney, Agent, or Firm*—Browdy & Neimark, PLLC (57) ABSTRACT

Disclosed is a forgery-preventing film having a structure in which a thermoplastic resin film is attached to both faces of a light-shielding layer processed for forgery prevention. It is impossible to recognize the letter information to be protected in the forgery-preventing film without peeling the information-concealing layer therefrom.

24 Claims, 2 Drawing Sheets

FORGERY-PREVENTING FILM

This application is a CIP of PCT/JP02/07172, filed Jul. 15, 2002.

BACKGROUND OF THE INVENTION

1. Field of the Invention

The present invention relates to a forgery-preventing film which is highly effective for protection against forgery and is usable in bank notes, bills, checks, traveler's checks, securities, cards and others that must be protected against forgery and falsification.

2. Description of the Background

In modern society, numerous documents and cards with forgery and duplication being prohibited are in circulation, such as bank notes, checks, securities, and cards. The forgery and duplication of these items must not only be prohibited by law, but must also be rendered technically impossible to maintain social order. However, copying and duplication technologies have made alarming strides in recent years, with the risk of forgery and duplication increasing each year. The crime of forgery has been increasing of late, and the techniques employed are becoming ever more sophisticated.

Figure 2:
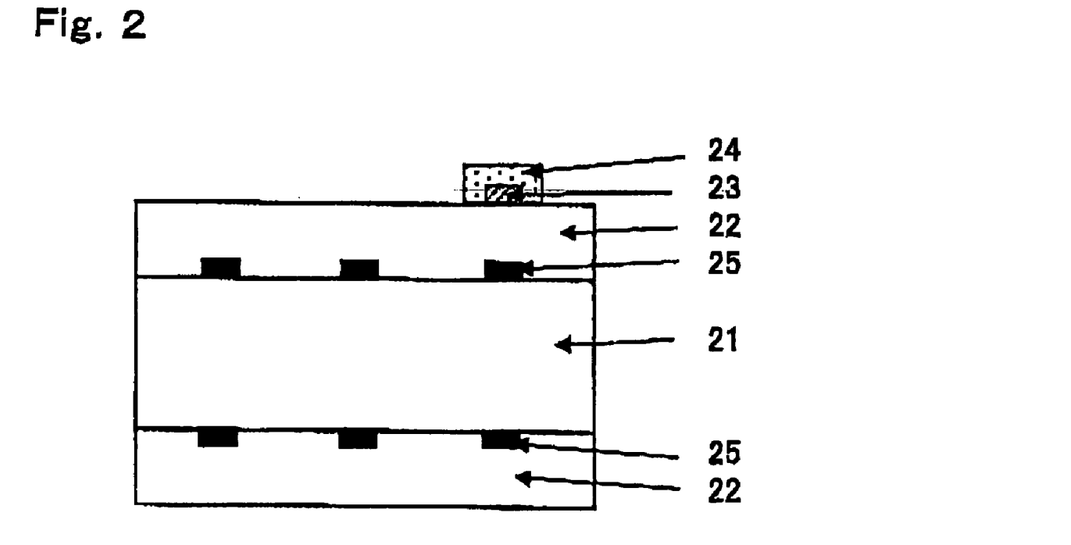
FIG. 2 is a cross-sectional view of a conventional card.

For various cards heretofore in use, information-concealed cards are known as in FIG. 2, in which some information common to the card-issuing company such as the company's name, trademark or the like is printed (25) on at least one surface of a card substrate (21) of, for example, white polyvinyl chloride resin or polyester resin through offset printing, gravure printing, silk screen printing or the like, and a laminate film (22) of transparent resin for protection of the common information is laminated on its surface, and an information print part (23) with a piece of information to be concealed and an information-concealing layer (24) for concealment of the information print part are formed in order on that surface to thereby conceal the letter information printed in the information print part. Cutting off the information-concealing layer from the cards of the type makes it possible to recognize the letter information printed in the information print part.

However, the information-concealed cards having the constitution as above are problematic in that light transmittance therethrough from the back face thereof may make it possible to recognize the letter information to be protected in them even though the information-concealing layer is not removed.

The present invention has been made in consideration of the above-mentioned problems, and its object is to provide a forgery-preventing film through which information could not be readily read out.

SUMMARY OF THE INVENTION

We, the present inventors have assiduously studied and, as a result, have found that a structure with a thermoplastic resin film attached to both surfaces of a light-shielding layer in which the light-shielding layer is processed for forgery prevention may provide a forgery-preventing film having the intended effect, and, on the basis of this finding, we have reached the present invention.

Specifically, the invention provides a forgery-preventing film having a structure in which a thermoplastic resin film is attached to both faces of a light-shielding layer processed for forgery prevention.

Preferably in the forgery-preventing film of the invention, the treatment of the light-shielding layer for forgery prevention is to make the layer shaded. Also preferably, the shading is invisible by reflected light but visible by transmitting light. Also preferably, the total light transmittance through the light part of the shaded area is from 5 to 12 percent. Also preferably, the forgery-preventing treatment is by printing. Also preferably, the light part of the forgery-preventing area has a dot ratio of from 5 to 70 percent. Also preferably, the surface of the outermost thermoplastic resin film is subjected to pigment coating and/or lamination.

The invention encompasses cards having the forgery-preventing film of the invention.

BRIEF DESCRIPTION OF THE DRAWINGS

In these drawings, 11 is a thermoplastic resin film; 12 is a light-shielding layer; 13 is treatment for forgery prevention; 14 is printing; 15 is a laminate film; 16 is secrete information; 17 is an information-concealing layer; 18 is other information; 21 is a thermoplastic resin film; 22 is a laminate film; 23 is an information print part; 24 is an information-concealing layer; and 25 is printing.

BEST MODE FOR CARRYING OUT THE INVENTION

The forgery-preventing film of the invention is described in detail hereinunder. In this description, the numerical range expressed by the wording "a number to another number" means the range that falls between the former number indicating the lowermost limit of the range and the latter number indicating the uppermost limit thereof.

Figure 1:
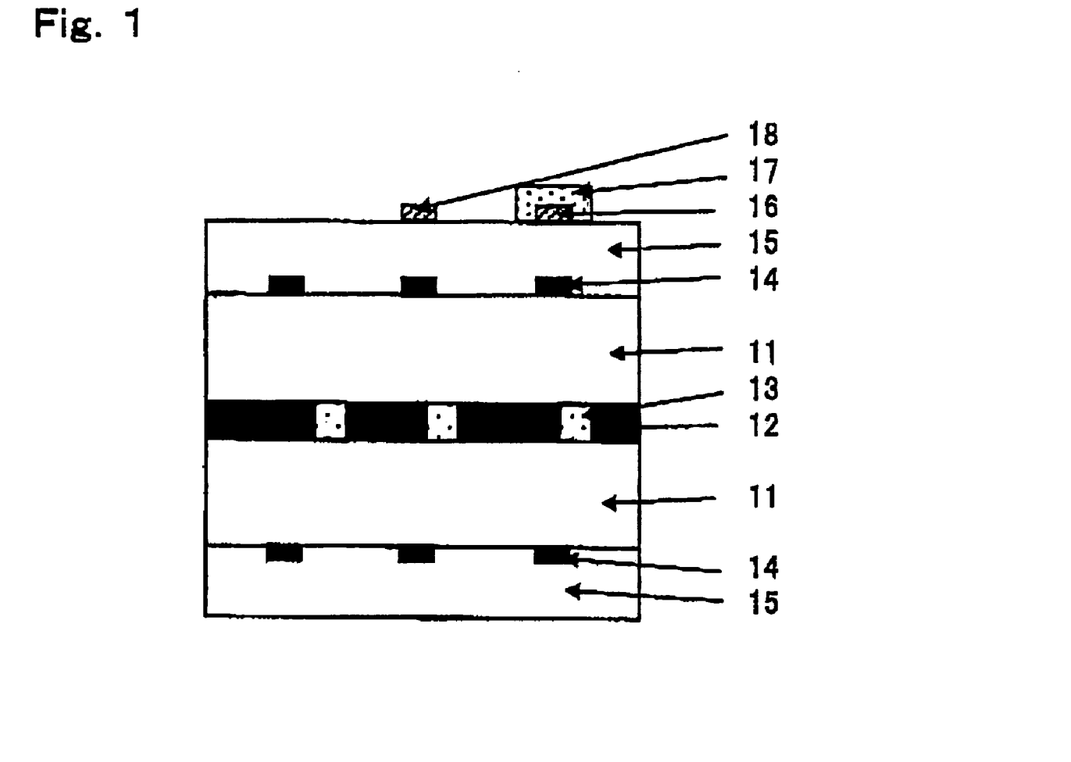
FIG. 1 is a cross-sectional view of the forgery-preventing film of Example 1 of the invention.

As one embodiment of the forgery-preventing film of the invention, for example, the structure as in FIG. 1 is preferred. This is so designed that a thermoplastic resin film (11) is symmetrically attached to both faces of a light-shielding layer (12), and the light-shielding layer is processed for forgery prevention (13). After the thermoplastic resin film (11) is printed (14), its surface is processed for lamination (15), and the laminate surface is processed to have secrete information letters (16), an information-concealing layer (17) and other information (18) thereon.

The layers that constitute the forgery-preventing film of the invention are described hereinunder in order, and their production and applications are also described.

Thermoplastic Resin Film (11)

Thermoplastic resin film (11) constituting the forgery-preventing film of the present invention, comprises at least a thermoplastic resin.

Examples of the thermoplastic resin employed in thermoplastic resin film (11) are: high-density polyethylene, medium-density polyethylene, low-density polyethylene, and other ethylene based resins; propylene based resins, polymethyl-1-pentene, ethylene-cyclic olefin copolymers, and other polyolefin resins; nylon 6, nylon 6,6, nylon 6,10, nylon 6,12, and other polyamide resins; polyethylene terephthalate and copolymers thereof; polyethylene naphthalate, aliphatic polyester and other thermoplastic polyester resins; and polycarbonates, atactic polystyrene, syndiotactic polystyrene, polyphenylenesulfide, and other thermoplastic resins. Two or more of these compounds may be combined for use. Of these, the use of polyolefin resins is preferred. Among the polyolefin resins, from the perspectives of cost, water resistance, and chemical resistance, the use of propylene based resin and high-density polyethylene is preferred.

The propylene based resin employed is desirably a propylene homopolymer (polypropylene) exhibiting isotactic, syndiotactic or some degree of stereoregularity, or copolymer comprising a principal component in the form of propylene with ethylene, 1-butene, 1-hexene, 1-heptene, 4-methyl-1-pentene, or some other α-olefin. These copolymers may be two-component, three-component, or four-component systems, as well as random copolymers or block copolymers.

In addition to a thermoplastic resin, thermoplastic resin film (11) also desirably comprises an inorganic finepowder and/or an organic filler.

An inorganic finepowder with an average particle diameter of from 0.01 to 15 micrometers, preferably from 0.01 to 8 micrometers, and more preferably, from 0.03 to 4 micrometers may be employed. Specifically, calcium carbonate, calcined clay, silica, diatomaceous earth, talc, titanium dioxide, barium sulfate, alumina, or the like may be employed.

An organic filler with an average particle diameter following dispersion of from 0.01 to 15 micrometers, preferably from 0.01 to 8 micrometers, and more preferably from 0.03 to 4 micrometers may be employed. A resin differing from the thermoplastic resin that is the principal component is desirably selected as the organic filler. For example, when the thermoplastic resin is a polyolefin resin, the resin for the organic filler is desirably polyethylene terephthalate, polybutylene terephthalate, polycarbonate, nylon 6, nylon 6,6, cyclic olefin homopolymer, or the copolymer of a cyclic olefin and ethylene, having a melting point of from 120 to 300° C. or a glass transition temperature of from 120 to 280° C.

As needed, heat stabilizers, photostabilizers, dispersants, lubricants, fluorescent whitening agents, colorants, and the like may also be blended into thermoplastic resin film (11).

For example, 0.001 to 1 weight percent of a steric hindered phenol-based, phosphorus-based, or amine-based stabilizer may be blended in as the heat stabilizer. For example, 0.001 to 1 weight percent of a steric hindrance amine, benzotriazole-based, benzophenone-based, or other photostabilizer may be blended in as the photostabilizer. For example, 0.01 to 4 weight percent of a silane coupling agent, a higher aliphatic acid such as oleic acid or stearic acid, a metal soap, polyacrylic acid, polymethacrylic acid, or salts thereof may be blended in as the dispersant of the inorganic finepowder. For example, 0.001 to 1 weight percent of imidazole, imidazolone, triazoley thiazole, oxazole, oxadiazole, cumarin, carbostyryl, thiadiazole, napthylimido, or pyrazolone may be blended in as the fluorescent whitening agent; specific examples are 2,5-bis[5-t-butylbenzooxazolyl(2)]thiophene, dicyclohexyl phthalate, 4-methoxynaphthalic acid-N-methylimide, diaminostylbenedisulfonic acid derivatives, and diaminostylbene derivatives. Pellets that have been colored with various pigments may be blended in a proportion of 5 to 30 weight percent as coloring agents.

Thermoplastic resin film (11) of the forgery-preventing film of the present invention may have a single-layer structure or a multilayer structure of two layers or more. Thermoplastic resin film (11) or a portion of a layer comprising thermoplastic resin film (11) may be stretched in at least one direction.

Preferably, the thickness of the thermoplastic resin film (11) is from 25 to 300 micrometers, more preferably from 30 to 200 micrometers, even more preferably from 40 to 150 micrometers.

When the thermoplastic resin film (11) in the forgery-preventing film of the invention has a three-layer structure [A2/A1/A3] of a layer (A1), a layer (A2) and a layer (A3), then the thickness of (A2+A3) is preferably at least 0.5 μm. In particular, the forgery-preventing film is preferably so designed that the layer (A1) contains from 10 to 99.5 weight percent of a polyolefin resin and from 0.5 to 90 weight percent of an inorganic finer powder and/or an organic filler, and the layer (A2) and the layer (A3) contain from 25 to 100 weight percent of a polyolefin resin and from 0 to 75 weight percent of an inorganic fine powder and/or an organic filler. More preferably, the forgery-preventing film is so designed that the layer (A1) contains from 30 to 97 weight percent of a polyolefin resin and from 3 to 70 weight percent of an inorganic finer powder and/or an organic filler, and the layer (A2) and the layer (A3) contain from 30 to 97 weight percent of a polyolefin resin and from 3 to 70 weight percent of an inorganic fine powder.

If the content of the inorganic fine powder and/or the organic filler to be in the thermoplastic resin film (11) is over 75 weight percent, then the surface strength of the film tends to lower after stretched and the surface of the film tends to be readily broken by mechanical impact or the like applied thereto during use.

Any other layer may be provided between the layer (A1), the layer (A2) and/or between the layer (A2) and the layer (A3) in the thermoplastic resin film (11) that constitutes the forgery-preventing film of the invention.

One may be selected from the above-mentioned inorganic fine powders or organic fillers and used singly, or two or more from them may be combined and used.

Preferably, the thermoplastic resin film (11) is stretched in at least one direction and its porosity calculated according to the following formula is from 1 to 60 percent, more preferably from 2 to 40 percent, even more preferably from 10 to 35 percent. If the porosity is smaller than 1 percent, then the film may not be able to lightweight; but if larger than 60 percent, then the film strength may be poor.

$$\text{Porosity (percent)} = [(\rho 0 - \rho)/\rho 0] \times 100 \quad \text{(Formula 1)}$$

In the formula, $\rho 0$ indicates the true density of the stretched film; $\rho$ indicates the density (JIS-P8118) of the stretched film. So far as the non-stretched material does not contain much air, the true density is nearly equal to the density of the non-stretched film.

Preferably, the opacity of the thermoplastic resin film (11) is from 10 to 97 percent (according to JIS-P-8138). If it is smaller than 10 percent, then the porosity of the film may be smaller than 1 percent and the film may not be able to lightweight. If it is larger than 97 percent, then the light part of the shaded area for forgery prevention may be unclear.

Preferably, the density of the stretched, porous thermoplastic resin film is from 0.65 to 1.10 g/cm$^3$. When the film is semi-transparent, then its density is preferably from 0.90 to 1.10 g/cm$^3$. When the film is opaque, then its density is preferably from 0.65 to less than 0.90 g/cm$^3$.

The thermoplastic resin film (11) may be either a single layer or a laminate of two or more layers. The method of lamination for the film is not specifically defined, and any known lamination method may be employed. For example, resin melts from multiple extruders may be laminated in one die by the use of a feed block or a multi-manifold (coextrusion), or may be laminated in a mode of melt extrusion lamination, or may be laminated in a mode of dry lamination with adhesive.

The stretching method for the film is not also specifically defined. The film may be uniaxially or biaxially stretched in any known manner of, for example, machine-directional uniaxial stretching, machine-directional uniaxial multi-stage stretching, cross-directional uniaxial stretching, bidirectional successive biaxial stretching, bidirectional simultaneous biaxial stretching, or their combination. In general, the film is stretched at a temperature not higher than the melting point of the thermoplastic resin that forms it. Thus stretched, the inorganic fine powder or the organic filler in the film peels from the thermoplastic resin at their interface, and this is propagated and expanded by further stretching the film to give fine pores in the thus-stretched film. The stretching and the lamination may be effected in any mode of their combination.

One example of the thermoplastic resin film (11) is polypropylene-based synthetic paper that contains an inorganic fine powder or an organic filler, for example, as in JP-B46-40794 and 56-55433, JP-A 57-149363, 57-181829, 9-66564 and 11-198313, and U.S. Pat. No. 4,377,616.

After having formed a laminate structure, the thermoplastic resin film (11) is preferably surface-modified through surface treatment thereof for improving the antistatic property and the printability of the film. One embodiment of the surface treatment is a combination of surface oxidation and treatment with a surface treatment agent.

The surface oxidation treatment may be conducted by the use, either singly or in combination, of generally employed corona discharge treatment, flame treatment, plasma treatment, glow discharge treatment, ozone treatment, or the like. Of these, the corona treatment and flame treatment are preferred. The corona treatment level is desirably from 600 to 12,000 $J/m^2$ (10 to 200 $W·min/m^2$), with from 1200 to 9,000 $J/m^2$ (20 to 150 $W·min/m^2$) being preferred. The flame treatment is desirably conducted at from 8,000 to 200,000 $J/m^2$, with from 20,000 to 100,000 $J/m^2$ being preferred.

The surface treatment agent may be selected chiefly from among the following primers and antistatic polymers, and may thus be a single compound or a mixture of two or more components. From the perspective of preventing static and improving adhesion in a dry laminate, the preferred surface treatment agent is a primer or a combination of primer and antistatic polymer.

Examples of primers constituting surface treatment agents suitable for use are: polyethyleneimine, polyethyleneimines modified with alkyl halides having from 1 to 12 carbon atoms, ethyleneimine adducts of poly(ethyleneimine-urea) and polyaminepolyamide and epichlorhydrin adducts of polyamine polyamides, and other polyethyleneimine polymers; acrylic acid amide-acrylic acid ester copolymers; acrylic acid amide-acrylic acid ester-methacrylic acid ester copolymers, polyacrylamide derivatives, oxazoline group-comprising acrylic acid ester polymers, polyacrylic acid esters, and other acrylic acid ester polymers; polyvinyl pyrrolidone, polyethylene glycol, polyvinyl alcohol, and other water-soluble resins; and polyvinyl acetate, polyurethane, ethylene-vinyl acetate copolymers, polyvinylidene chloride, polypropylene chloride, acrylonitrile-butadiene copolymers, and other water-dispersible resins.

Of these, the compounds of preference are the polyethyleneimine polymers, urethane resins, and polyacrylic acid esters. The compounds of greater preference are the polyethyleneimine polymers. And the compounds of even greater preference are polyethyleneimines having a degree of polymerization of from 20 to 3,000, the ethyleneimine adducts of polyamine polyimides, and modified polyethyleneimines obtained by modifying these compounds with alkyl halides having from 1 to 24 carbon atoms, alkenyl, halides having from 1 to 24 carbon atoms, cycloalkyl halides having from 1 to 24 carbon atoms, and benzyl halides having from 1 to 24 carbon atoms.

Examples of antistatic polymers comprising surface treatment agents are cationic polymers, anionic polymers, and amphoteric polymers. Examples of cationic polymers are polymers having quaternary ammonium salt or phosphonium salt structures, nitrogenous acrylic polymers, and nitrogenous acrylic or methacrylic polymers having a quaternary ammonium salt structure. Examples of amphoteric polymers are nitrogenous acrylic or methacrylic polymers having a betaine structure. Examples of anionic polymers are styrene-maleic anhydride copolymers and their alkali metal salts, alkali metal salts of ethylene-acrylic acid copolymers, and alkali metal salts of ethylene-methacrylic acid copolymers. Of particular preference are nitrogenous acrylic or methacrylic polymers having a quaternary ammonium salt structure.

The molecular weight of the antistatic polymer may be adjusted as desired based on the polymerization temperature, the type and quantity of polymerization initiator employed, the quantity of solvent employed, the chain-transfer agent employed, and other polymerization conditions. The molecular weight of the polymer obtained is generally from about 1,000 to 1,000,000, with a range of from 1,000 to 500,000 being preferred.

The surface treatment agent employed in the present invention may comprise as needed a crosslinking agent, alkali metal salt, alkaline earth metal salt, or the like.

The addition of a crosslinking agent to the surface treatment agent further improves coating strength and water resistance. Examples of crosslinking agents are glycidyl ether, glycidyl ester, and other epoxy compounds; epoxy resin; and isocyanate-based, oxazoline-based, formalin-based, and hydrazide-based water-dispersible resins. The quantity of crosslinking agent added normally falls within a range of less than or equal to 100 weight parts per 100 weight parts of the active components, excluding solvent, of the surface-modifying agent.

Examples of the alkali metal salts and alkaline earth metal salts employed in the surface treatment agent are water-soluble inorganic salts such as sodium carbonate, sodium bicarbonate, potassium carbonate, sodium sulfite, and other alkali salts; and sodium chloride, sodium sulfate, sodium nitrate, sodium tripolyphosphate, sodium pyrophosphate, ammonium alum, and the like. The quantity added is normally less than or equal to 50 weight parts per 100 weight parts of the active components, excluding solvent, of the surface-modifying agent.

Surfactants, antifoaming agents, water-soluble and water-dispersible finepowder substances, and other adjuvants may be added to the surface-modifying agent. The quantity of these components is normally less than or equal to 20 weight parts per 100 weight parts of the active components, excluding solvent, of the surface-modifying agent.

The individual components of these surface treatment agents may be dissolved for use in water or a hydrophilic solvent such as methyl alcohol, ethyl alcohol, or isopropyl alcohol. Of these, use in the form of an aqueous solution is conventional. The concentration of the aqueous solution is normally from 0.1 to 20 weight percent, desirably from about 0.1 to 10 weight percent.

Coating may be conducted by roll coater, blade coater, bar coater, air-knife coater, size press coater, gravure coater, reverse coater, die coater, lip coater, spray coater, or the like. As required, smoothing may be conducted and a drying step may be employed to remove excess water or hydrophilic solvent.

The coating amount is 0.005 to 5 $g/m^2$, desirably 0.01 to 2 $g/m^2$, based on dry components.

The surface treatment may be conducted either before or after longitudinal or traverse stretching. The surface treatment agent may be applied in a single application or in a multistage application.

Pigment Coating

For further improving the printability of the thermoplastic resin film (11), at least the face to be printed of the film may be coated with pigment. In general, the pigment coating is effected after the treatment for surface oxidation of the thermoplastic resin film (11).

For the pigment coating agent, usable is any one for ordinary coated paper, comprising from 10 to 80 weight percent of pigment such as clay, talc, calcium carbonate, magnesium carbonate, aluminium hydroxide, silica, aluminium silicate, calcium silicate, plastic pigment, titanium dioxide or white clay powder, and from 20 to 90 weight percent of adhesive. The adhesive for this includes latex of SBR (styrene-butadiene rubber), MBR (methacryl-butadiene rubber) or the like, and acrylic emulsion (e.g., acrylate resin-containing aqueous solution), starch, PVA (polyvinyl alcohol), CMC (carboxymethyl cellulose) methyl cellulose, etc. In addition to these ingredients, the coating agent may further contain a dispersant such as specific sodium polycarboxylate, a crosslinking agent such as polyamido-urea resin, and also an antifoaming agent, a waterproofing agent, a lubricant, a fluorescent dye, etc. The pigment coating agent may be used as a water-soluble coating agent generally having a solid concentration of from 5 to 90 weight percent, preferably from 35 to 65 weight percent.

For applying the pigment coating agent to the substrate layer, concretely employed is a coating means of gravure coating, mayer bar coating, roll coating, blade coating, size-press coating, hot-melt coating or the like. The coating amount may be from 0.1 to 50 g/m$^2$, but preferably from 1 to 15 g/m$^2$. The thickness of the coating layer may be from 0.05 to 50 micrometers, preferably from 0.5 to 20 micrometers, more preferably from 5 to 15 micrometers. The coating layer may be formed on one or both faces of the film.

If desired, the coated surface may be press-smoothed, for example, by calendering. Also if desired, the coating may be effected twice or more.

After thus surface-treated, a recording layer may be formed on the film, if desired. The recording layer can be printed in the form of a film or a roll by any mode of electrophotography using a dry toner or a liquid toner, sublimation thermal transferring, melt thermal transferring, direct thermal transferring, rewritable marking or inkjet printing, or by any other mode of letterpress printing, rotary letterpress printing, gravure printing, flexographic printing, solvent offset printing or UV-curable offset printing.

Light-Shielding Layer

The light-shielding layer (12) that is to be present between the thermoplastic resin films (11) may be formed, for example, by <1> forming a color print layer such as a black solid print layer having a thickness of from 1 to 5 micrometers on the back face of the thermoplastic resin film (11) in a mode of offset printing or gravure printing, or <2> adding a large amount (5 to 75 weight percent) of white filler such as titanium oxide whiskers or titanium oxide particles, or a colored pigment such as carbon black to an adhesive (anchor-coating agent) and applying from 2 to 10 g/m$^2$ of the resulting adhesive to the film (11), or <3> applying from 2 to 10 g/m$^2$ of an adhesive to both surfaces of a colored cloth, or <4> depositing aluminium or the like on the back face of the thermoplastic resin film (11) in a mode of vacuum evaporation. Additionally, incorporation of a magnetic material in the color print layer enables magnetic forgery prevention.

Disposing the light-shielding layer (12) between the thermoplastic resin films (11) to fabricate the forgery-preventing film of the invention makes the film have a total light transmittance (according to JIS K-7105) within a wavelength range of from 380 to 780 nanometers of smaller than 5 percent, preferably at most 2 percent, more preferably at most 0.5 percent, and, accordingly, the secrete information letters (16) are prevented from being seen through the information-concealing layer (17) from the opposite face of the film.

Treatment for Forgery Prevention

In the forgery-preventing film of the invention, the light-shielding layer (12) is processed for forgery prevention. The treatment for forgery prevention may be effected by making the layer shaded. For it, for example, when a black solid print, layer having a thickness of from 1 to 5 μm is formed on the back face of the thermoplastic resin film (11) in a mode of offset printing or gravure printing, the dot ratio of the print is varied to fall between 5 and 70%. The shading of the light-shielding layer must be invisible by reflected light but visible by transmitting light. For the shading, for example, any desired shading pattern with any different density and different patterning profile may be employed depending on the object of forgery prevention. The areal ratio of the dark part and the light part of the shaded area is not specifically defined. In general, the dark part may be at least 90% and the light part may be at most 10%, and at least the part to form the secrete information letters (16) is shaded darkly.

The total light transmittance (according to JIS K-7105) within a wavelength range of from 380 to 780 nanometers through the light part is preferably from 5 to 12 percent, more preferably from 5 to 11 percent. If it is smaller than 5 percent, then the light part may not be seen clearly even by transmitted light and it may be unsatisfactory for forgery prevention. On the other hand, if it is larger than 12 percent, then the opacity of the film may be low and, as a result, the light part of the forgery-preventing film may be seen transparently through the film even in the absence of transmitted light.

The dot ratio is preferably from 5 to 70 percent, more preferably from 20 to 60 percent. If it is smaller than 5 percent, then the light part of the forgery-preventing film may be seen transparently through the film even in the absence of transmitted light. On the other hand, if it is larger than 70 percent, then the light part may not be seen clearly even by transmitted light and it may be unsatisfactory for forgery prevention.

Adhesive

The adhesive for bonding the thermoplastic resin film (11) with the light-shielding layer (12) formed thereon to another thermoplastic resin film (11) may be a liquid anchor coating agent. For example, it includes polyurethane-type anchor coating agents such as Toyo Morton's EL-150 (trade name), or a mixture of BLS-2080A and BLS-2080B; and polyester-type anchor coating agents such as Toyo Morton's AD-503 (trade name). The amount of the anchor coating agent to be applied is from 0.5 to 25 g/m$^2$.

For hot-melt adhesives such as ethylene-vinyl acetate copolymer, low-density polyethylene, ethylene-(meth) acrylic acid copolymer metal salt (Surlyn), polyethylene chloride or polypropylene chloride, thermoplastic resins of which the melting point is lower than the stretching temperature in producing the stretched resin films must be used. If the hot-melt adhesives are used at a temperature higher than the stretching temperature, then the stretched resin films may shrink.

When the anchor coating agent is used, it is applied to the face of one thermoplastic resin film and then another thermoplastic resin film is attached to it and pressed with pressure rolls. When the hot-melt adhesive is used, its melt is filmwise extruded out through a die onto the face of one thermoplastic resin film and laminated thereon and then another thermoplastic resin film is attached to it and pressed with pressure rolls.

Lamination

After printed, the thermoplastic resin film (11) or the laminated thermoplastic resin film is further processed for lamination for making the film resistant to abrasion and resistant to staining. For example, using the above-mentioned anchor coating agent, the thermoplastic resin film (11) or the laminated thermoplastic resin film is further processed for lamination with a fluorine-containing varnish coat, a PET film, a polyvinyl chloride film or the like. The laminating film is preferably transparent, but may be colored so far as it does not detract from the effect of the forgery-preventing film.

For further improving the heat resistance of the forgery-preventing film, an additional thermoplastic resin film may be laminated on at least the face to be printed of the thermoplastic resin film (11). The thermoplastic resin to be laminated thereon includes, for example, polyamide resins such as nylon-6, nylon-6,6, nylon-6,10, nylon-6,12; thermoplastic polyester resins such as polyethylene terephthalate and its copolymer, polyethylene naphthalate, aliphatic polyester; and other thermoplastic resins such as polycarbonate. Of those, preferred are thermoplastic polyester resins; and of thermoplastic polyester resins, more preferred are polyethylene terephthalate and its copolymer.

The method of lamination is not specifically defined and may be any known one. For example, resin melts from multiple extruders may be laminated in one die by the use of a feed block or a multi-manifold (coextrusion), or may be laminated in a mode of melt extrusion lamination, or may be laminated in a mode of dry lamination with adhesive.

For the type and the use of the adhesive for dry lamination, referred to is the description of the adhesive given hereinabove.

For further improving the printability of the laminated thermoplastic resin film, at least the face to be printed of the film may be coated with pigment. For the pigment-coating agent and the coating method, referred to is the description of the pigment coating given hereinabove.

If desired, a recording layer maybe formed on the laminated thermoplastic resin film. The recording layer may be so designed that it may be processed not only in any mode of electrophotography, sublimation thermal transferring, melt thermal transferring, direct thermal transferring, rewritable marking or inkjet printing, but also in any other mode of letterpress printing, gravure printing, flexographic printing, solvent offset printing or UV-curable offset printing. Further, the layer may also be so designed that it may be processed in a mode of printing in the form of a film or of rotary pressing on rolled forms.

The forgery-preventing film of the present invention can be broadly applied to any item the forging of which must be prevented. Examples are bank notes, bills, checks, traveler's checks, lottery tickets, product certificates, stock certificates, other securities, various cards, entry tickets, tickets, national identity cards, driver's licenses, resident cards, household registers, official stamp certificates, passports, visas, deposit certificates, and pledge certificates.

The forgery-preventing film of the present-invention may have an adhesive layer. Such film can be used as a label, which is useful in preventing forgery of printed information such as contents and seller. Any known adhesive layer, adhesives for the adhesive layer, coating method and coating amount of the adhesives may be employed in fabrication of the label.

The following Production Examples 1 to 3 are to demonstrate the production of thermoplastic resin films; Examples 1 to 4 and Comparative Examples 1 to 3 are to demonstrate the fabrication of forgery-preventing films; and the forgery-preventing films are tested in Test Example. The materials and their amount and ratio, the details of the treatments, and the process of the treatments employed in the following Examples may be suitably varied, not overstepping the idea of the invention. Accordingly, the scope of the invention should not be limitatively interpreted by the Examples mentioned below,

PRODUCTION EXAMPLE 1

Production of Thermoplastic Resin Film 1

(1) A resin composition (A1) comprising 81 weight percent of propylene homopolymer (Japan Polychem's trade name Novatec PP, MA-8, having a melting point of 164° C.), 3 weight percent of high-density polyethylene (Japan Polychem's trade name Novatec HD, HJ580, having a melting point of 134° C. and a density of 0.960 g/cm$^3$), and 16 weight percent of calcium carbonate (Shiraishi Calcium's Softon 1800) having a mean particle size of 1.2 micrometers was kneaded in a extruder set at a temperature of 270° C., then sheetwise extruded out, and cooled in a cooling device to obtain a non-stretched sheet. The sheet was again heated up to 150° C., and hen stretched 5-fold in the machine direction to be a 5-fold MD-stretched film.

(2) A composition (A2) comprising 51.5 weight percent of propylene homopolymer (Japan Polychem's trade name Novatec PP, MA-3, having a melting point of 165° C.), 3.5 weight percent of high-density polyethylene (Japan Polychem's trade name HJ580, having a density of 0.950 g/cm$^3$), and 45 weight percent of calcium carbonate (Shiraishi Calcium's Softon 1800) having a mean particle size of 1.2 micrometers was kneaded in 2 extruders at 210° C., then sheetwise extruded out through a die and laminated on both surfaces of the 5-fold MD-stretched film prepared in the previous step (1) to give a three-layered laminate film. Next, the three-layered laminate film was cooled to 60° C., then again heated up to about 155° C., stretched 7.5-fold in the cross direction with a tenter, annealed at 165° C., and cooled to 60° C., and then its edges were trimmed away to give a three-layered (uniaxial stretched/biaxial stretched/uniaxial stretched), thermoplastic resin film 1 having a thickness of 150 micrometers (A2/A1/A2=30 μm/90 μm/30 μm)), an opacity of 96%, a porosity of 31%, and a density of 0.77 g/cm$^3$.

PRODUCTION EXAMPLE 2

Production of Thermoplastic Resin Film 2

(1) A composition (A1) comprising 55 weight percent of propylene homopolymer (Japan Polychem's trade name Novatec PP, MA-8, having a melting point of 164° C.), 25 weight percent of high-density polyethylene (Japan Polychem's trade name HJ580, having a density of 0.950 g/cm$^3$), and 20 weight percent of calcium carbonate (Shiraishi Calcium's Softon 1800) having a mean particle size of 1.2 micrometers; a composition (A2) comprising 99 weight percent of propylene homopolymer (Japan Polychem's trade name Novatec PP, MA-3, having a melting point of 164° C.) and 1 weight percent of rutile titanium dioxide (Ishihara Sangyo's CR-10) having a mean particle size of 0.2 micrometers; and (A3) 100 weight percent of propylene homopolymer (Japan Polychem's trade name Novatec PP, MA-8, having a melting point of 164° C.) were separately melt-kneaded in different three extruders at 250° C., fed into one coextrusion die, laminated (A2/A1/A3) therein and sheetwise extruded out, and then cooled with a chill roll to about 60° C. to give a laminate film.

(2) The laminate film was again heated up to 145° C., then stretched 5-fold in the machine direction by utilizing the difference in the peripheral speed of a number of rolls, again heated up to about 150° C., and then stretched 8.5-fold in the cross direction with a tenter. Next, this was annealed at 160° C. and cooled to 60° C., and then its edges were trimmed away to give a three-layered (biaxial stretched/biaxial stretched/biaxial stretched), thermoplastic resin film 2 having a thickness of 150 micrometers (A2/A1/A2=3 μm/144 μm/3 μm), an opacity of 94%, a porosity of 40%, and a density of 0.66 g/cm$^3$.

PRODUCTION EXAMPLE 3

Production of Thermoplastic Resin Film 3

(1) A composition (A1) comprising 60 weight percent of propylene homopolymer (Japan Polychem's a trade name Novatec PP, MA-8, having a melting point of 164° C.), 20 weight percent of high-density polyethylene (Japan Polychem's trade name HJ580, having a density of 0.950 g/cm$^3$), and 20 weight percent of calcium carbonate (Shiraishi Calcium's Softon 1800) having a mean particle size of 1.2 micrometers; and a composition (A2) comprising 50 weight percent of propylene homopolymer (Japan Polychem's trade name Novatec PP, MA-3, having a melting point of 164° C.), 45 weight percent of calcium carbonate (Shiraishi Calcium's Softon 1800) having a mean particle size of 1.2 micrometers, and 5 weight percent of rutile titanium dioxide (Ishihara Sangyo's CR-10) having a mean particle size of 0.2 micrometers were separately melt-kneaded in different three extruders at 250° C., fed into one coextrusion die, laminated (A2/A1/A2) therein and sheetwise extruded out, and then cooled with a chill roll to about 60° C. to give a laminate film.

(2) The laminate film was again heated up to 135° C., then stretched 5-fold in the machine direction by utilizing the difference in the peripheral speed of a number of rolls, again heated up to about 150° C. and annealed, then cooled to 60° C., and then its edges were trimmed away to give a three-layered (uniaxial stretched/uniaxial stretched/uniaxial stretched), thermoplastic resin film 3 having a thickness of 150 micrometers (A2/A1/A2=5 μm/140 μm/5 μm), an opacity of 90%, a porosity of 40%, and a density of 0.8 g/cm$^3$.

EXAMPLES 1 TO 3, AND COMPARATIVE EXAMPLES 1 TO 3

Six types of forgery-preventing films of Examples 1 to 3 and Comparative Examples 1 to 3 were fabricated under different conditions as in Table 1 and according to the process mentioned below.

Figure 3:
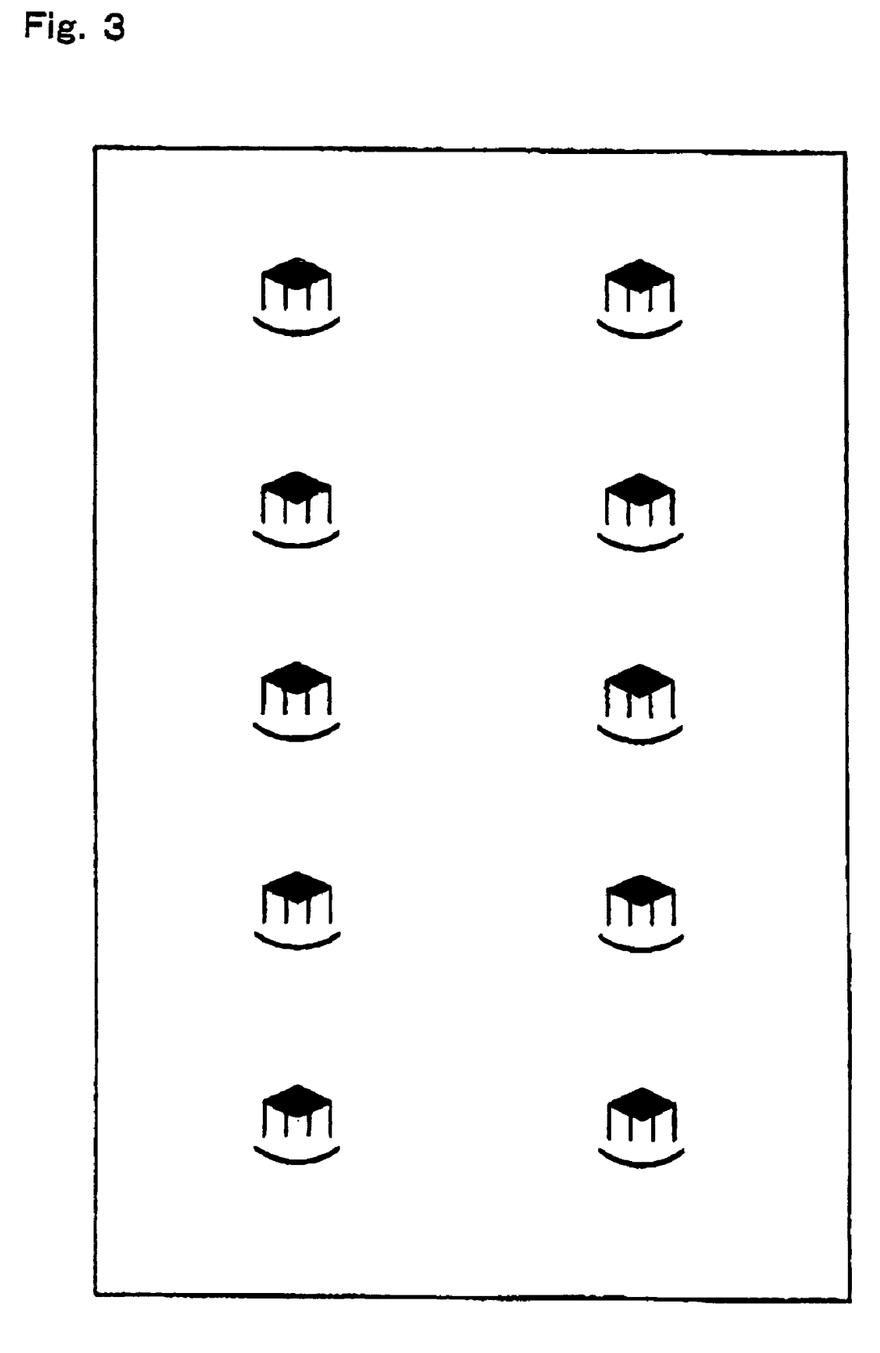
FIG. 3 is a forgery-preventing pattern used in Example 1.

The surface indicated in Table 1 of the thermoplastic resin film of the type also indicated in Table 1 was gravure-printed in black (thickness: 2 micrometers) with a pattern of FIG. 3 for forgery prevention. The dot ratio of the light part of the pattern is shown in Table 1. In the actual printing, the white and the black are reversed, or that is, the white background is printed in solid black and the black pattern is printed lightly in accordance with the indicated dot ratio. With that, the film was coated with 2 g/m$^2$ of a polyurethane anchor-coating agent (mixture of BLS-2080A and BLS-2080B), and then another thermoplastic resin film of the same type was attached to the film by the use of pressure rolls with its surface of (A2) facing thereto, thereby giving a support of thermoplastic resin film/forgery-preventing light-shielding layer/thermoplastic resin film having a thickness of 304 micrometers. Only in Comparative Example 1, the black gravure printing was not carried out, and the support fabricated had a thickness of 302 micrometers.

On both surfaces of the support thus obtained, printed were the name of the card company, the instructions to users, the column for card number, the column for secrete information letters and others, in a mode of four-color offset printing. Next, 2 g/m$^2$ of a polyurethane anchor-coating agent (EL-150) was applied to both surfaces of the support, which was then coated with a transparent polyvinyl chloride film having a thickness of 110 μm via the anchor-coating agent therebetween by the use of pressure rolls.

Further, the card number and the secrete information were printed in the column for the card number and the column for secrete information, respectively, using a melt thermal transfer printer, and an information-concealing layer was formed on the secrete information in a mode of scratch printing. The thickness of the thus-fabricated forgery-preventing film is shown in Table 1.

EXAMPLE 4

15 parts by weight of 2-hydroxyethyl methacrylate, 50 parts by weight of methyl methacrylate, 35 parts by weight of ethyl acrylate and 100 parts by weight of toluene were fed into a three-neck flask equipped with a stirrer, a reflux condenser tube and a thermometer, and purged with nitrogen. 0.6 parts by weight of a polymerization initiator, 2,2'-azobisisobutyronitrile was added to it, and the monomers were polymerized at 80° C. for 4 hours. Thus obtained, the solution was a toluene solution of 50 percent of hydroxyl group-containing methacrylate polymer having a hydroxyl value of 65.

Next, 100 parts by weight of the solution was blended with 20 parts by weight of a methyl ethyl ketone solution of vinyl chloride/vinyl acetate copolymer (Shin-Daiichi Enbi's ZEST C150ML) (20%), 20 parts by weight of an ethyl acetate solution of hexamethylene diisocyanate (Nippon Polyurethane Industry's Colonate HL) (75%), 20 parts by weight of an aqueous solution of silanol group-containing polyvinyl alcohol copolymer (Kuraray's R-1130 having a degree of polymerization of 1700), and 20 parts by weight of heavy calcium carbonate powder (by Shiraishi Calcium) having a mean particle size of 1.5 micrometers. Butyl acetate was added to the resulting mixture to thereby make it have a solid content of 35%. This is a pigment coating solution.

The pigment coating solution was applied onto the surface of a polyethylene terephthalate film (Toray's trade name Lumirror) having a thickness of 25 micrometers in an amount of 1 g/m$^2$ in terms of the dry solid content thereof, and then cured at 80° C. for 1 hour. Thus processed, the polyethylene terephthalate film had a coating layer formed thereon.

Next, an adhesive of Toyo Morton's polyurethane anchor-coating agent that is a mixture of BLS-2080A and BLS-2080B was applied to both faces of the 304 μm-thick support prepared in Example 1 in an amount of 4 g/m$^2$ in terms of the solid content thereof. On the surface of the support, the polyethylene terephthalate film prepared in the above was laid with the pigment coating layer of the film facing outside; and on the back face of the support, a polyethylene terephthalate film (Teijin-DuPont Film's trade name Melinex 377) having a thickness of 19 micrometers was laid and pressed with pressure rolls. Thus fabricated, the laminate had a structure of pigment coating layer/polyethylene terephthalate film/thermoplastic resin film/forgery-preventing light-shielding layer/thermoplastic resin film/polyethylene terephthalate film, and had a thickness of 357 micrometers.

On both surfaces of the laminate thus obtained, printed were the name of the card company, the instructions to users, the column for card number, the column for secrete information letters and others, using a tandem color laser printer (Casio's N4-612ii). Next, 2 g/m$^2$ of a polyurethane anchor-coating agent (EL-150) was applied to both surfaces of the laminate, which was then coated with a transparent polyvinyl chloride film having a thickness of 110 μm via the anchor-coating agent therebetween by the use of pressure rolls.

Further, the card number and the secrete information were printed in the column for the card number and the column for secrete information, respectively, using a melt thermal transfer printer, and an information-concealing layer was formed on the secrete information in a mode of scratchprinting. The thickness of the fabricated forgery-preventing film is shown in Table 1.

TEST EXAMPLE

The forgery-preventing films fabricated in Examples 1 to 4 and Comparative Examples 1 to 3 were analyzed for the total light transmittance and the visibility by reflected light and transmitted light, according to the methods mentioned below.

Measurement of Total Light Transmittance:

The total light transmittance (according to JIS K-7105) within a wavelength range of from 380 to 780 nm through the dark part and the light part of the shaded area of the forgery-preventing film was measured with a spectrophotometer (Hitachi's U-3310 Model).

Visibility Evaluation:

1) Visibility by Reflected Light:

Separated by 30 cm from it, a 20-W fluorescent lamp was disposed on the front face of the forgery-preventing film, and the shaded area of the film was visually observed and evaluated in the following three ranks.

○: The shaded area formed for forgery prevention was not differentiated at all from the other area around it.

Δ: The light part of the shaded area for forgery prevention was seen transparently to be whitish, and this is problematic in practical use.

x: The light part of the shaded area for forgery prevention was seen transparently to be whitish and the print in the back side was recognized, and this is problematic in practical use.

2) Visibility 1 by Transmitted Light:

Separated by 10 cm from it, a 20-W fluorescent lamp was disposed on the back face of the forgery-preventing film, and the shaded area of the film was visually observed and evaluated in the following three ranks.

○: The light part of the shaded area formed for forgery prevention was seen transparently to be whitish, and the pattern formed was clearly seen.

Δ: The light part formed for forgery prevention could be visually seen, but the pattern formed could not be seen clearly, and this is problematic in practical use.

x: The difference between light and dark in the shaded area formed for forgery prevention was quite unclear at all, and this is problematic in practical use.

3) Visibility 2 by Transmitted Light:

Separated by 5 cm from it, a 20-W fluorescent lamp was disposed on the back face of the forgery-preventing film, and the information-concealing layer part of the film was visually observed and evaluated in the following three ranks, ○: The secret letters below the information-concealing layer were not seen at all.

x: The secret letters below the information-concealing layer were recognized, and this is problematic in practical use.

The results are given in Table 1.

TABLE 1

| | | Structure | | | | | Evaluation | | |
| | | Thermoplastic resin film | | | | | | | |
| | Film No. | Layer gravure-printed | Light shielding layer | Dot ratio of light part (%) | Thickness (μm) | Total light transmittance (%) | | Visibility by reflected light | Visibility 1 by transmitted light | Visibility 2 by transmitted light |
| | | | | | | Dark part | Light part | | | |
|---|---|---|---|---|---|---|---|---|---|---|
| Example 1 | 1 | A2 | yes | 50 | 525 | 0.5 | 8 | ○ | ○ | ○ |
| Example 2 | 2 | A3 | yes | 20 | 525 | 0.5 | 11 | ○ | ○ | ○ |
| Example 3 | 3 | A2 | yes | 60 | 525 | 0.5 | 7 | ○ | ○ | ○ |
| Comparative Example 1 | 1 | A2 | no | 0 | 520 | 14 | 14 | — | — | x |
| Comparative Example 2 | 1 | A2 | yes | 3 | 525 | 0.5 | 13.6 | x | ○ | ○ |
| Comparative Example 3 | 1 | A2 | yes | 90 | 525 | 0.5 | 4 | ○ | x | ○ |
| Example 4 | 1 | A2 | yes | 50 | 575 | 0.5 | 7.5 | ○ | ○ | ○ |

As is obvious from Table 1, it is difficult to recognize the letter information to be protected in the forgery-preventing film of the invention without peeling the information-concealing layer from the film, and application of the forgery-preventing treatment to the concealing layer makes it possible to readily differentiate forged matters from real things.

The present disclosure relates to the subject matter contained in International Application PCT/JP02/07172 filed on Jul. 15, 2002 and Japanese Patent Application No. 215783/2001 filed on Jul. 16, 2001, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A forgery-preventing film having a structure in which a thermoplastic resin film is attached to both faces of a light-shielding layer processed for forgery prevention;
    wherein the light-shielding layer has shading;
    wherein the shading is invisible by reflected light but visible by transmitting light;
    wherein the total light transmittance through the light part of the shaded area is from 5 to 12 percent; and
    wherein the light part of the forgery-preventing area has a dot ratio of from 5 to 70 percent.

2. The forgery-preventing film as claimed in claim 1, wherein the proportion of the dark part of the shaded area is at least 90 percent, and that of the light part thereof is at most 10 percent.

3. The forgery-preventing film as claimed in claim 1, wherein the light-shielding layer is printed.

4. The forgery-preventing film as claimed in claim 1, wherein the total light transmittance is less than 5 percent.

5. The forgery-preventing film as claimed in claim 1, wherein the light-shielding layer is a color print formed on one of the thermoplastic resin films in a mode of offset or gravure printing to have a thickness of from 1 to 5 micrometers.

6. The forgery-preventing film as claimed in claim 5, wherein the color print contains a magnetic material.

7. The forgery-preventing film as claimed in claim 1, wherein the light-shielding layer is formed by applying from 2 to 10 g/m$^2$ of an adhesive that contains from 5 to 75 weight percent of white filler and/or colored pigment.

8. The forgery-preventing film as claimed in claim 1, wherein the light-shielding layer comprises vapor deposited aluminium on one of the thermoplastic resin films.

9. The forgery-preventing film as claimed in claim 1, wherein the thermoplastic resin film has a multilayer structure comprising a first thermoplastic layer and at least one additional thermoplastic layer.

10. The forgery-preventing film as claimed in claim 9, wherein a said additional thermoplastic layer is laminated on the surface of the first thermoplastic layer.

11. The forgery-preventing film as claimed in claim 10, wherein the additional thermoplastic layer laminated to the first thermoplastic layer is a thermoplastic polyester resin layer.

12. The forgery-preventing film as claimed in claim 11, wherein the polyester of the additional thermoplastic layer is a polyethylene terephthalate or its copolymer.

13. The forgery-preventing film as claimed in claim 1, wherein the surface of the outermost thermoplastic resin film is subjected to pigment coating.

14. The forgery-preventing film as claimed in claim 1, wherein the surface of the outermost thermoplastic resin film is printable in any mode of electrophotography using a dry toner or a liquid toner, sublimation thermal transferring, melt thermal transferring, direct thermal transferring or inkjet printing.

15. The forgery-preventing film as claimed in claim 1, wherein the surface of the outermost thermoplastic resin film is subjected to lamination.

16. In a material comprising a forgery-preventing film, the improvement wherein
    the forgery-preventing film is the films of claim 1.

17. The material as claimed in claim 16, which is in the form of a card.

18. The material as claimed in claim 16, which is in the form of a security.

19. The material as claimed in claim 16, which is in the form of a certificate.

20. The material as claimed in claim 16, which is in the form of a bill.

21. The material as claimed in claim 16, which is in the form of a ticket.

22. The material as claimed in claim 16, which is in the form of a check.

23. The material as claimed in claim 16, which is in the form of a license.

24. The material as claimed in claim 16, which is in the form of a label.

* * * * *